US012789415B1

(12) United States Patent
Neff

(10) Patent No.: US 12,789,415 B1
(45) Date of Patent: Nov. 10, 2026

(54) EXPANDED POLYSTYRENE DENSIFIER

(71) Applicant: Better Shredders, LLC, York, PA (US)

(72) Inventor: Brent E Neff, York, PA (US)

(73) Assignee: Better Shredders, LLC, York, PA (US)

( * ) Notice: Subject to any disclaimer, the term of this patent is extended or adjusted under 35 U.S.C. 154(b) by 61 days.

(21) Appl. No.: 19/064,257

(22) Filed: Feb. 26, 2025

(51) Int. Cl.

| | |
|---|---|
| ***B29C 48/27*** | (2019.01) |
| ***B29B 9/02*** | (2006.01) |
| ***B29B 13/10*** | (2006.01) |
| ***B29B 17/00*** | (2006.01) |
| ***B29C 48/00*** | (2019.01) |
| ***B29C 48/285*** | (2019.01) |
| ***B29C 48/80*** | (2019.01) |
| ***B29C 48/92*** | (2019.01) |
| ***B29C 48/96*** | (2019.01) |
| *B29B 9/16* | (2006.01) |
| *B29C 48/275* | (2019.01) |

(52) U.S. Cl.
CPC ............ *B29B 17/0047* (2013.01); *B29B 9/02* (2013.01); *B29B 13/10* (2013.01); *B29C 48/022* (2019.02); *B29C 48/2715* (2019.02); *B29C 48/2883* (2019.02); *B29C 48/80* (2019.02); *B29C 48/802* (2019.02); *B29C 48/92* (2019.02); *B29C 48/965* (2019.02); *B29B 2009/166* (2013.01); *B29B 17/0026* (2013.01); *B29C 48/277* (2019.02); *Y02P 20/143* (2015.11)

(58) Field of Classification Search
CPC ............................ B29B 13/10; B29B 17/0047
See application file for complete search history.

(56) References Cited

U.S. PATENT DOCUMENTS

| | | | | |
|---|---|---|---|---|
| 2,838,801 A * | 6/1958 | De Long | C08J 11/06 | 264/37.32 |
| 3,504,399 A * | 4/1970 | Wolf | B29B 17/00 | 100/145 |
| 3,607,999 A * | 9/1971 | Corbett | B29B 17/0036 | 425/432 |
| 3,723,582 A * | 3/1973 | Winstead | B29B 17/0005 | 264/37.32 |
| 3,752,631 A * | 8/1973 | Corbett | B29B 17/0036 | 425/456 |

(Continued)

*Primary Examiner* — Benjamin A Schiffman
(74) *Attorney, Agent, or Firm* — Woods Rogers PLC; Timothy J. Bechen

(57) ABSTRACT

An apparatus for densifying foam includes an intake chute having an aperture for receiving foam therein, at least one grinder mechanism for converting the foam into foam particles and an augur receiving the foam particles from the grinder mechanism and transporting the foam particles. The apparatus includes a heating unit heating the foam particles from a first temperature to a second temperature, as well as an extrusion unit compressing the foam particles at the second temperature into a compressed state and an extrusion outlet for removal of the foam particles in the compressed state. The apparatus includes a control panel including a visual display component and executable instructions for operation of the apparatus, such that the augur is prohibited from operation until the heating unit reaches a predetermined operating temperature and the control panel including graphical user interface functions.

8 Claims, 4 Drawing Sheets

(56) References Cited

U.S. PATENT DOCUMENTS

| | | | | | |
|---|---|---|---|---|---|
| 4,033,907 | A * | 7/1977 | Wolf | B29B 17/0042 | 521/40.5 |
| 4,067,826 | A * | 1/1978 | Emery | B29B 17/0412 | 521/46.5 |
| 4,254,068 | A * | 3/1981 | Otsuka | B29B 17/00 | 425/223 |
| 4,821,922 | A * | 4/1989 | Miller | B29B 13/022 | 177/184 |
| 5,470,521 | A * | 11/1995 | Wenzel | B30B 9/3035 | 264/918 |
| 5,635,224 | A * | 6/1997 | Brooks | B02C 18/186 | 425/456 |
| 5,645,862 | A * | 7/1997 | Sable | B29B 17/0047 | 425/73 |
| 5,672,304 | A * | 9/1997 | Keilert | B29C 48/767 | 264/102 |
| 5,882,558 | A * | 3/1999 | Bacher | B29B 17/0005 | 264/102 |
| 6,130,261 | A * | 10/2000 | Harfmann | B29B 17/00 | 156/99 |
| 6,270,330 | B1 * | 8/2001 | Cheng | C08J 11/08 | 425/383 |

* cited by examiner

EXPANDED POLYSTYRENE DENSIFIER

RELATED APPLICATIONS

There are no related applications.

FIELD OF THE INVENTION

The invention relates generally to an apparatus for densifying expanded polystyrene, expanded polyethylene, and/or expanded polypropylene foams and method thereof.

BACKGROUND

Expanded polystyrene (EPS), expanded polyethylene (EPE), and expanded polypropylene (EPP) foams (collectively referred to herein as "foams") are chemically stable and can last for generations. These foams having many beneficial uses, including safe transport of physical items during shipping. Complications arise in the handling and disposal of foams, including costs associated with volume versus weight of transport. Therefore, a densifier is a known technique for improving handling and disposal of used foam.

There are two primary densifier techniques, cold compaction densifiers and thermal densifiers. Cold compaction densifiers are only effective with EPS and can be ineffective with EPE and EPP because these materials can spring back after compaction.

For thermal densifiers, it is known to process foams by placing them into a pre-breaker, which grounds the expanded polystyrene into pieces sized approximately 1 to 2 inches, and then compressing the pieces in a densifier. The densifier comprises a heat chamber that receives the pieces from the pre-breaker via an auger that compresses the pieces into the heat chamber, through a screen and ultimately through an extrusion port in a melted, flowing state. This melted material flows into a mold creating a log or brick that is shipped offsite, including for example to processors for making new expanded foams.

The existing techniques for densifying foams have numerous operational shortcomings that affect not only the life and longevity of the densifier, but can adversely effects on machine operators.

For instance, densifiers include manual control panels, typically limited to knobs, switches, and indicator lights. These manual control panels require experienced operators with unique knowledge skills for properly controlling the machine.

By of example, a common problem in densifiers is operator failure for allowing the machine to properly warm-up. Densifiers operate by applying heat to foam particles and then applying a compressive force, typically using an augur that rotates to push the foam into an extrusion. When a densifier is turned off, there are foam remnants in the machine. As the heat source is turned off, these remnants cool and harden. When restarting the machine, the hardened foam must be reheated prior to engagement of the augur or other pushing mechanisms. If an unskilled or errant operator uses the densifier prior to foam becoming malleable, this can cause the augur or other push mechanism(s) to break, causing the densifier to be non-operational until fixed.

Under current densifier technology, analog controls require the educated user to manually delay operations until an analog interface indicates the foam has become properly heated. Or in the alternative, to know specific light indicators that illuminate when a temperate is reached. But current densifier technology does not have any type of circuit or computer-based control for inhibiting operation of the densifier until the requisite operating conditions are met.

Another operational concern of densifiers is the potentially toxic fumes and/or odors generated by the heating of the foams. Currently, densifiers require operation in either an external room with high ventilation or to be installed with internal ventilation piping to an external outlet. These requirements can both restrict the placement and usability of densifiers. Additionally, many users are leasing warehouse or other industrial space, thus requiring costly building modifications with costs allocated between the user (tenant) and the landlord.

Additionally, there are practical and safety concerns for users operating the densifiers, including potential health concerns with extended exposure to potentially toxic fumes.

As such, there exists a need for an apparatus and operating method associated with a densifier correcting the operational deficiencies noted above.

BRIEF DESCRIPTION

The present invention provides an apparatus and operating method of an improved densifier. In one embodiment, the densifier described herein is a thermal densifier, but operational features can also be applied to and used with a cold densifier.

A method of densifying polypropylene according to one embodiment of the invention comprises reducing the foam into relatively small particles and heating and compressing the particles to form densified foams. The foam can be reduced to the small particles by grinding. The foam can be reduced to intermediate pieces prior to reduction to the small particles. The expanded polypropylene can be reduced to the intermediate pieces by pre-breaking. During the heating of the particles, heat can be applied to increase the temperature of the foam to a temperature below its melting temperature yet sufficiently high to weaken the bonds and overcome the memory of the material.

An apparatus for densifying foam according to one embodiment of the invention comprises a grinder for reducing foam into relatively small particles and a densifier for heating and compressing the particles to form densified polypropylene. The densifier can comprise a ram and platen system that compresses the particles in a densification chamber and a heater that heats the densification chamber and, thereby, the foam in the densification chamber. The apparatus can further include a hopper that collects the particles from the grinder and gravity feeds the particles into the densifier.

One embodiment includes an augur or other transport mechanism for directing the foam particles across the heating mechanism and compressing the foam into a subsequent extrusion device.

In one embodiment, the densifier can operate without applying heat, a cold densifier. The cold densifier can operate similar to a thermal densifier using compression forces to remove air from the foam but typically achieves less compression and densification. Cold densifiers are preferrable for embodiments where the input foam includes moisture and/or operating conditions of the densifier impede thermal operations, e.g. operating in a high humidity environment.

The apparatus further includes a computerized control module including both software controlling both operational parameters and at least one graphical user interface ("GUI"). The apparatus further includes a display screen having the at least one GUI displayed thereon. Via user commands received through the GUI, as well as operational parameters within the control module, the densifier operations can be managed to avoid user error and damage to the system.

The apparatus further includes at least one air filtration system for collecting and filtering fumes omitted during the densifier operations. This air filtration system includes capturing exhaust output, filtering using one or more appropriate filtering techniques, and venting the filtered air exhaust within the same operating space as the densifier. In another embodiment, the filter air exhaust can be piped to another internal room or external, but the densifier operation does not expressly require external ventilation for improved comfort and care for the operators.

The densifier, including computerized controls, ventilation, and operations controlled by the computerized controls, improves upon the shortcomings of existing technology, improves densifier operations and ensure against malfunctions.

BRIEF DESCRIPTION OF THE DRAWING

The invention will be described with respect to the following drawing figures, in which like numerals represent like features throughout the description, and in which.

DETAILED DESCRIPTION

Figure 1:
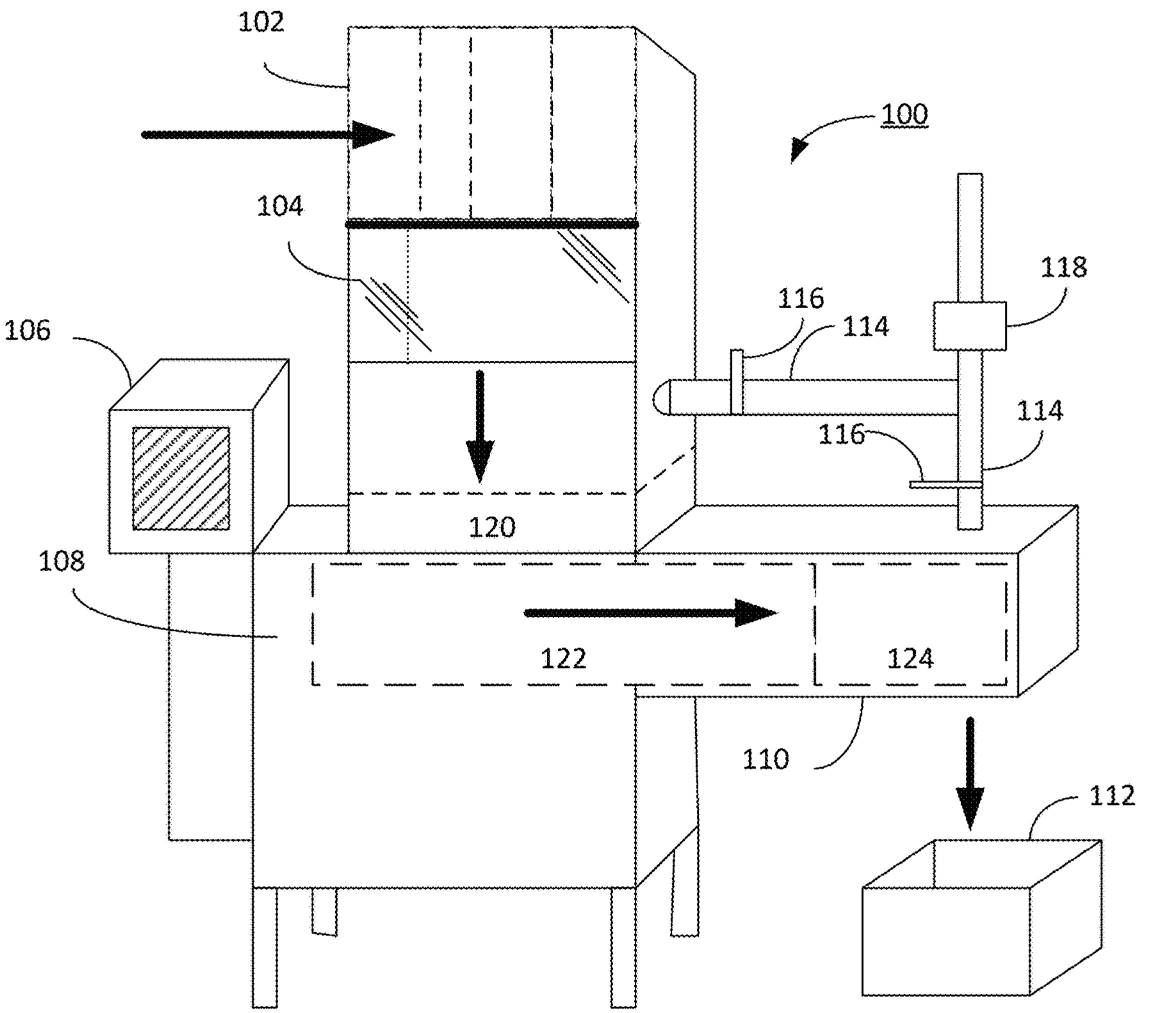
FIG. 1 is a schematic diagram of one embodiment of a foam densifier machine.

FIG. 1 is a schematic diagram of one embodiment of densifier 100. The densifier 100 can operate a stand-alone processing unit or can be a modular unit with various components interconnected and/or interchangeable.

The densifier includes a feed portion 102, which can be a general aperture leading into an intake tube. In this embodiment, the feed portion 102 can include covers, such as plastic flaps or other means for preventing either accidental insertion into the densifier 100 or minimize dust or other particulates from coming back out the feed portion 102.

In this embodiment, the densifier 100 includes a clear screen 104, such as a clear plastic, glass, or other translucent or semi-translucent element. This screen 104 allows for an operator to see into the feed portion.

The densifier 100 also includes an electronic control panel 106 including an electronic screen and a computerized GUI, as described in greater detail below. The panel 106 includes executable instructions for both interacting with an operator of the densifier 100, also having operational and safety protocols for ensuring the operational safety of the densifier 100.

The internal component 108 of the densifier 100 includes additional processing elements for grinding the foam fed therein, heating, transferring to a compaction/extruding component 110 and subsequent displacement into an external receptor 112.

Further visible in FIG. 1, the densifier 100 includes a vent 114 system including an air filtration device 116.

Not visible in FIG. 1, but illustrated in relief, the densifier 100 further includes a grinding mechanism 120 for grinding or otherwise breaking up the foam, to form foam particles. The foam particles are the feed via a conveyer belt or other mechanism means and can include the application of heat thereon in block 122. One embodiment may include an augur or other mechanism to feed the heated foam particles into a compactor unit 124 or other means for generating an extrusion of compressed heated foam particles.

In one operational embodiment, coarsely ground foam granules (a.k.a. "foam particles") are air-conveyed into a collecting bin. One embodiment can include level detectors to manage the operations of the grinding and feed rate. Operations can be controlled by sensors providing feedback to the controller 106. The foam particles are feed to an augur 122 within a collection cylinder. One embodiment includes a plurality of heating elements extending around an exterior portion of the cylinder, thus when activated, the heating elements heat the cylinder and also heat up the foam particles therein.

In one embodiment, the heating elements apply heat until the internal temperature within the cylinder is at least at a melting point of the foam.

In one embodiment, the heating zone can include any other suitable for of heat emitting device or module. In one embodiment, in a heating zone, the polystyrene reaches a temperature in an example range of between 220 degrees F. and 230 degrees F. A temperature sensor, can measure temperature and provide feedback to the controller 106, including at one or more positions along the heating zone.

The energy/heat applied in the heating zone primarily affects the foam being moved by the augur. Due to the heating, the foam particles begin to coalesce, e.g., the discrete particles convert to a semi-molten state and join to form large globules, nearly forming a continuous mass. The foam particles are converted to a semi-molten state, but not a pure molten state (e.g., not to a pure fluid), since the temperature required to convert polystyrene to a molten state is about 300 degrees F. Thus, the semi-molten state polystyrene globules are sticky, but not fluid. Advantageously, the semi-molten state polystyrene globules do not stick significantly to the augur.

Upon exiting from heating zone, the polystyrene material enters a pressure zone 124. In one embodiment, the pressure zone 124 is at a distal end of the tube having the foam pushed via the augur. The pressure zone 124 can include a mesh screen or other perforated covering creating backfill pressure as the foam is pushed by the augur. The heated foam particles pass through the screen, further releasing air and/or other gaseous elements allowing for the compacted, densified, foam particles.

In one embodiment, the augur can operate within a 3.5-inch pipe having an approximate 8 inch diameter. The extrusion process can include a domed cap with an extrusion point where the heated foam particles are pushed, extruded, via the augur rotational and compression force.

In further processing, the heated and compressed foam particles are processed in conjunction with heat sink operations to extract or otherwise support cooling the material as part of the extrusion process.

In one embodiment, a cooling system (not expressly illustrated) is provided for cooling heat sink assemblies. Cooling systems can include lower heat sink cooling manifold; upper heat sink cooling manifold; cooling hoses; hose interface manifold; and blower.

In this embodiment, a blower draws air or other fluid through cooling system. The air draw can include mechanisms for controlling and directing airflow for passing through the air filtration system noted herein.

In one example, non-limiting embodiment and mode of operation, the foam is cooled in the pressure zone 124 to a predetermined temperature which is below its "softening point". Various types of polystyrene foam have different "softening points". Simply put, the "softening point" is that temperature whereby a material can be reshaped and will hold the new shape. Sometimes this softening point is also referred to as a glass transition point. More precisely, the softening point is that temperature where the plastic starts transitioning from a solid to a pliable form that can be reshaped. Most often this softening point temperature for polystyrene is in a range of from about 166 degrees F. to about 230 degrees F., depending upon the grade of the polystyrene, and is commonly in a range of from about 170 degrees F. to about 200 degrees F. for most grades. In the non-limiting examples herein described, the speed of the belt can be set such that the final product being produced is a clear (or fairly clear) solid at a temperature below the softening point (so that, e.g., there is no sticking of the final product), and typically below 150° F. and preferably below 100° F. depending on ambient conditions and the throughput speed. When the temperature of this solid is below 150° F., and preferably below 100° F. and on the order of about 90° F., it has better ease and safety in handling. The temperature of the polystyrene foam grind upon leaving the pressure zone can be detected by temperature sensor(s), which communicate with the controller 106.

In a further embodiment, the densifier 100 may include a ventilation system providing for capturing and filtering of exhaust and/or other gaseous outputs, including odors, as generated by the densifier 100. In this embodiment, the densifier 100 includes two potential outlet valve points, one at the feeder/hopper and one off the heating 122 and compressing elements 124.

The filtering system include vent tubes 114 extending out from the device 100. In one embodiment, the vent tubes 114 may include toggle valves 116, where these can be slidable elements for closing off the airflow in the tubes 114. It is recognized that any other suitable type of valve or air flow restrictor may be used and the toggle valves are not expressly limiting herein.

As part of the filtering system, the tubes 114 can connect in a t-formation, merging the airflows. These airflows are then passed through a filter 118, as described in greater detail regarding FIG. 5 below.

Figure 2:
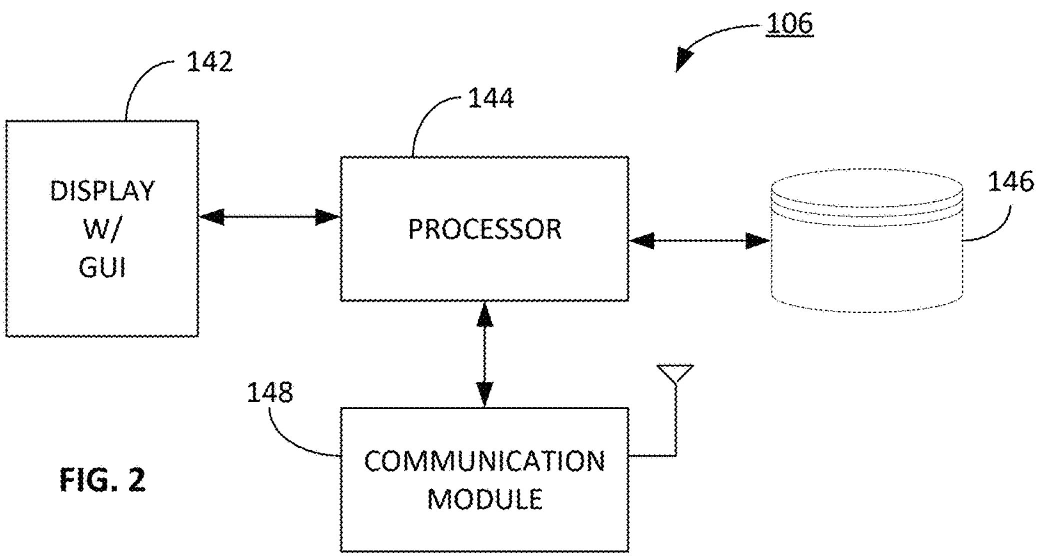
FIG. 2 is a box diagram of one embodiment of a computerized controller within the foam densifier machine.

In alternative embodiments, the densifier 100 can operate without the tubes 114, for example if the operator is unconcerned with gaseous/odorous output and/or the device is operated in a highly ventilated location. In another embodiment, the densifier 100 can operate with the tubes 114 running to an external location to the machine, for example vented outside a building, whereby the filter 118 may be omitted.

Where the above embodiment notes a thermal densifier, the densifier 100 may additionally operate as a cold densifier. The cold densifier can operate similarly but without the heating element, using pressure via the augur 122 to compress the foam particles. It is recognized that cold densifiers use similar operations to remove air from the foam particles and compression to extrude, but the compression rate for a cold densifier is lower, e.g. the foam particles are not as compacted, because without using heat the system does not melt or change the molecular structure of the foam particles.

Where FIG. 1 illustrates one embodiment of the densifier 100, FIG. 2 illustrates one embodiment of the controller 106 within the densifier 100. The controller 106 includes a display 142 with a graphical user interface (GUI), a processor 144, at least one database 146 storing executable instructions and operational parameters therein, and a communication module 148.

The display 142 may be any suitable type of display, including a touchscreen display capable of generating both an output display as well as receiving user instructions submitted via a touchscreen. While one embodiment includes the display 142 embedded within the controller 106, further embodiments may include non-embedded displays, including an electronically tethered tablet or laptop computer, a mobile phone or other mobile computing device as recognized by a skilled artisan.

Additionally, the display 142 may include multiple displays and is not expressly limited to a GUI output in an embedded screen. For example, one embodiment may include a first screen embedded within the controller 106 and a second external screen connected via wireless technology providing identical and/or similar outputs. In this example, the embedded screen can include operational controls allowing for turning the densifier on, activating the densification operations, and allowing for adjustment/termination of operations. In this embodiment, a second screen can include status updates, for example a control screen provided to a supervisor, control room, or other secondary system or user. In further embodiments, the second screen can include external notification systems, for example a mobile device, smart watch, third-party alarm or monitoring system, or any other suitable device or system for notifying individuals that may or may not be in direct vicinity of the densifier.

The processor 144 may be any suitable processor as recognized by a skilled artisan capable of performing processing operations as described herein. The processor 144 may include one or more processing units, operative to receive executable instructions from the database 146. These instructions can include executable software code for performing processing operations and operational controls as described herein.

The database 146 further includes operational parameters, including operational ranges, temperature ranges, minimum requirements for safely engaging moving components in the densifier, as well as failsafe and shut-off parameters. These operational parameters can be user generated and pre-programmed as part of the controller 106.

In another embodiment, the processor 144 may include executable instructions for a user to enter and/or update operational parameters via the GUI 142. For example, if different foams are being fed into the densifier, different operational parameters may be used such that a densifier processing just EPS may have different operational parameters than a densifier processing EPS, EPE, and EPP.

The communication module 148 is an interfacing element for interacting with external elements. For example, the densifier 100 may include multiple sensors (e.g. temperature sensors, conveyer belt speed sensors, power sensors, etc.). The module 148 is operative to communicate with these sensors. Communication can include start-up instructions for activating a sensor, status communications to confirm sensors are operating properly, on-going sensor readings via push and/or pull techniques, as well as override and/or shut-down instructions to inhibit damage to the densifier.

The communication module 148 may also communicate via both wired and wireless communication techniques. Various sensors may be hard-wired to the module 148. In other embodiments, sensors may be wirelessly connected.

Furthermore, the communication through the module 148 may include communications to external control systems or other systems external to the densifier. For example, an external system may be a user log-in system verifying the user is authorized and properly trained on using the densifier.

Operations of the controller 106 improve over prior densifier systems by including a graphical user interface, as well as including smart techniques via processing operations to monitor the densifier, communicate with users, modify operations for optimizing the densifier, and monitoring and controlling operations to prohibit damage to the densifier.

Figure 3:
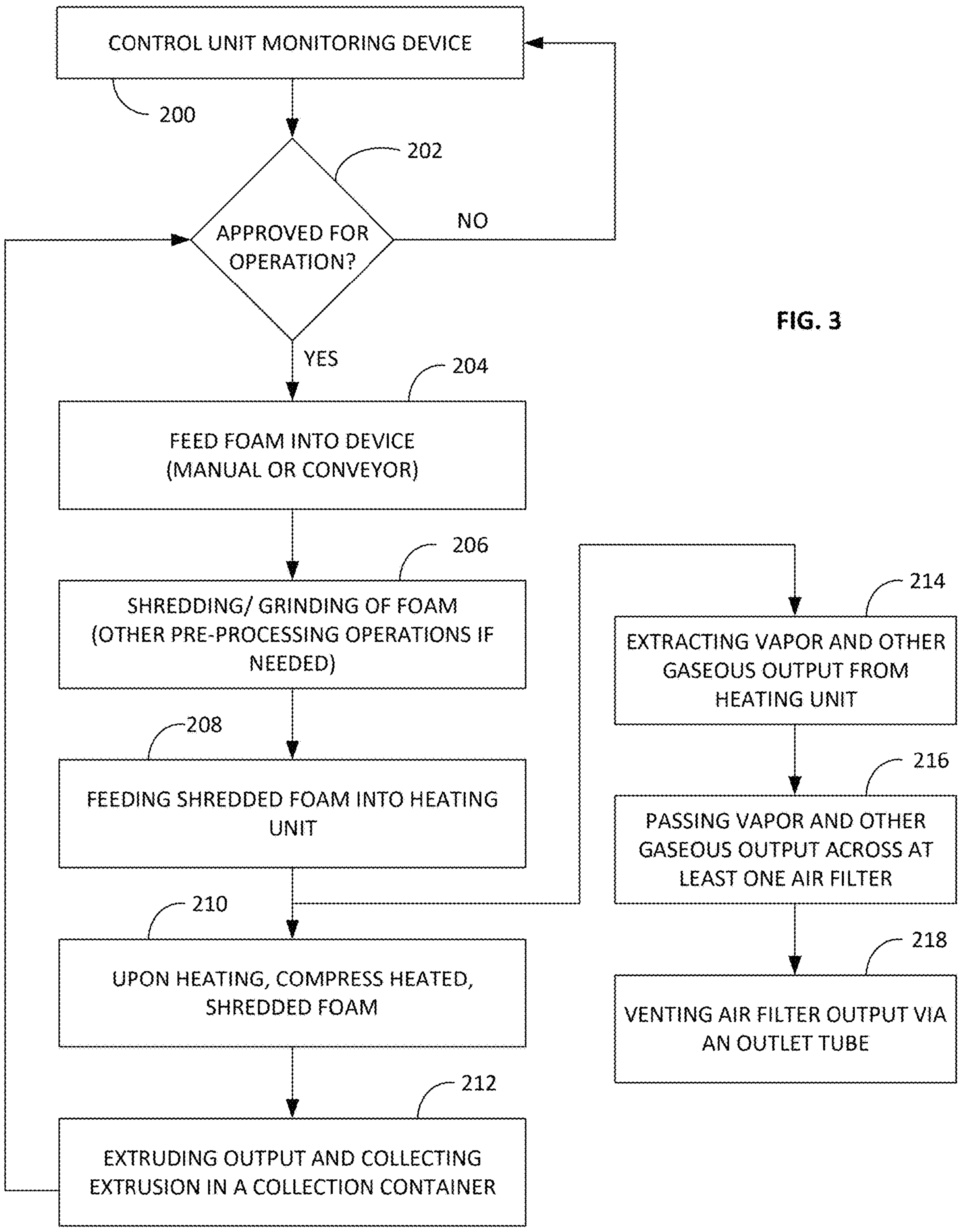
FIG. 3 is a flowchart of the steps of one embodiment of a method of operating the foam densifier machine.

FIG. 3 illustrates a flowchart of one embodiment of a method of operating a densifier, such as densifier 100 of FIG. 1. Step 200 is activation of the control unit monitoring device, such as controller 106 of FIG. 1. This can include turning on, waking up, logging in, or otherwise activating the controller. The controller communicates with sensors and other elements of the densifier to determine if the machine is in condition for operation. Step 202 is a decision step if the system is approved for operation.

As part of the operations of the control unit, the unit activates various elements, such as engaging the heating elements to warm-up areas of the machine, as well as prohibit the machine from operating until all operation conditions are satisfied. Thus, if the inquiry of step 202 is in the negative, the method reverts to step 200. This re-iterates until the step 202 inquiry is positive, e.g. the densifier is cleared for operation.

Step 204 is feeding foam into the device. This can be performed via manual insertion, such as one or more users manually shoving foam pieces into the shoot. This can also be performed by non-manual means, for example a conveyer belt or other feeder system.

Step 206 is shredding and/or grinding the foam into foam particles. Step 206 may include additional processing steps as determined by the controller. For example, if the foam particles are becoming airborne, the controller may determine inclusion of a spray or other liquid to suppress aeration of particles. For example, one processing step may be a feed rate monitor and adjusting the speed of the shredding and/or grinding of the foam and the subsequent feeding of the foam particles into later steps of the densifier.

Step 208 is feeding the shredded foam, e.g. foam particles, into a heating unit. In the above example of noting a feed rate, the controller may modify the speed of the feeding operations. This step may include multiple steps or stages, including rising the temperature of the foam particles over a defined period and monitoring the feed rate for proper heating of the foam particles within the desired range.

Step 210 is then compressing the heated, shredded foam. This may be performed using operations noted above regarding FIG. 1. Step 212 is then extruding output. The extrusion can include stages with heat sinks or other means for generating an extruded output within an acceptable temperature range, as recognized by a skilled artisan.

In the flow diagram of FIG. 3, the method then reverts back to step 202, inquiring if the densifier is still approved for operation. During operation, the method may continually toggle step 202, or at least at defined time periods. Thereby, through the controller operations and inquiry of step 202, if one or more operational parameters are outside acceptable or designated ranges, the controller can terminate operations of the densifier and reduce any likelihood of damage to the machine.

In a further embodiment, the densifier includes filtration system(s) for allowing for operations in either indoor locations and/or non-well-ventilated locations. Therefore, in the method of FIG. 3, upon heating the foam particles (steps 208 and 210) and the generating any toxic or noxious fumes, the method include steps 214 of extracting vapor and other gaseous outputs from the heating unit. This may include fans or other blower techniques and encapsulation of airflow within the densifier.

The method then includes, step 216, passing the vapor and other gaseous output across at least one air filter. The air filter may include one or more suitable air filters, including HEPA filter, charcoal-activated filter, by way of example. It is recognized by a skilled artisan that varying types of filters may be utilized for air filtration operations, including combinations of different air filters.

The filtration system can include one more fan for forcing air across the filter. Varying CFM fan powers can be utilized based on the operational features of the densifier, for example for high volume densification a higher-powered fan may be utilized, for example a 750 CFM. Whereas to more intermittent usage, a lower powered fan may be utilized, for example a 350 CFM.

In another embodiment, the filtration system can be a boxed system residing on a floor next to or near the densifier. For example, the tubing elements can vent the airflow to the grounded unit, for example using fans to pull the air off the densifier. The ground unit can then perform the filtration, releasing the filtered air output into the room.

Step 218 is then venting the air filter output via an outlet tube. In prior art densifiers, this output must be ventilated via piping to an outlet external to the building housing the densifier. Here, the internal plumbing for air capture and air flow management, as well as filtering, allows for safe operations of the densifier without requiring extensive modifications to an operating locus.

Figure 4:
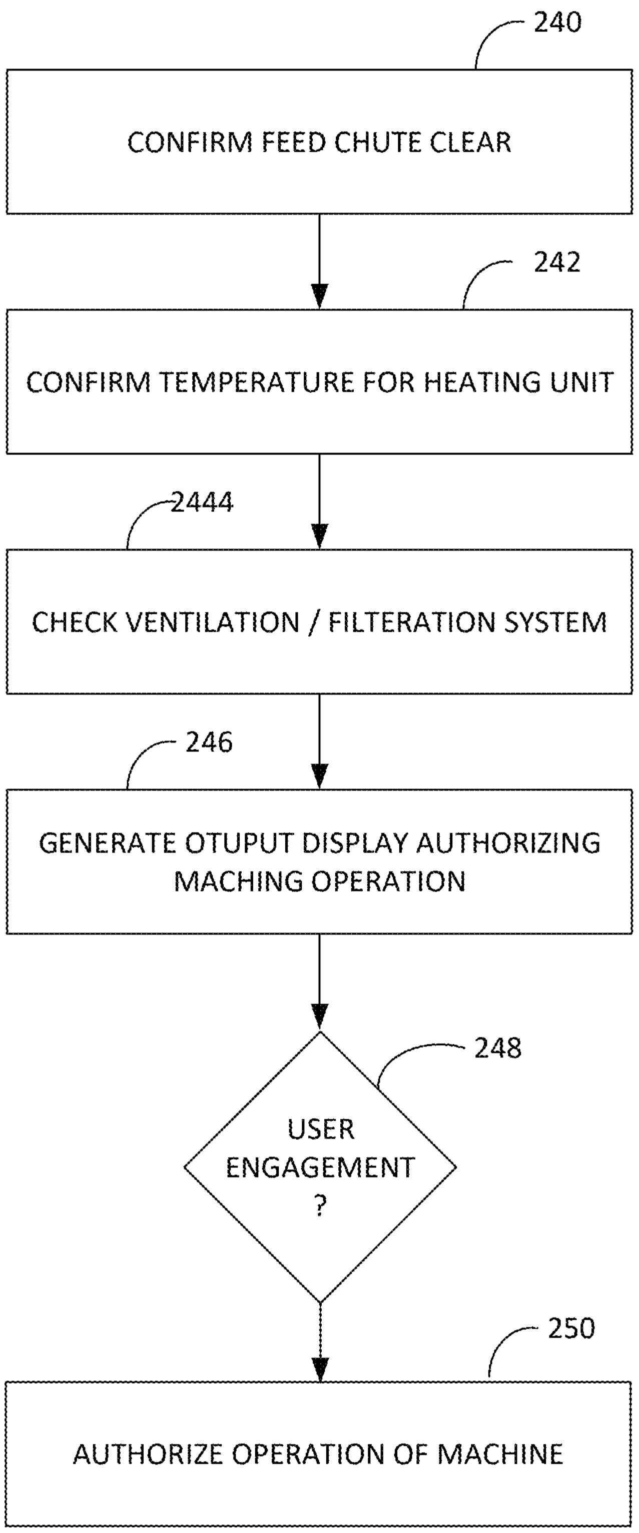
FIG. 4 is a flowchart of the steps of one embodiment of a method of operating the computerized controller.

FIG. 4 illustrates a flow chart of one embodiment of processing operations occurring as part of inquiry of step 202 of FIG. 3. These steps can include a checklist or other parameter checks prior to allowing full operation of the densifier. The method of FIG. 4 is a sample illustration of one embodiment and expressly limiting, such that to a skill artisan the checklist can include additional processing steps and are within the scope herein.

Step 240 is confirming the feed chute is clear. This may include checking sensors in the feed chute, for example a weight sensor detecting if there is anything resting on the bottom of the chute. This may include IR sensors detecting if anything within the chute is blocking an IR beam. This may include a camera sensor capturing an image of the inside of the chute, for example using image recognition software to analyze the image.

Step 242 is confirming the temperature of the heating unit. This can include a starting temperature as well as confirming both the rise in temperature and a rate of rise of temperature. For example, if it is determined the rate of temperature rise is too high, this could indicate the heating unit getting too hot.

Step 244 is checking the ventilation/filtration system. This can include sensors confirming airflow rates, for example if the airflow rate is too high this could indicate the filter is missing or damages and if the airflow rate is too low this could indicate the filter is full and needs to be replaced.

Step 246 is generating an output display authorizing machine operation. For example, this can be a GUI output indicating the machine has properly warmed up and requesting the user to select an engagement button via a touchscreen to start the components of the densifier for normal operation. In another embodiment, this can include a log-in screen or other user verification technique for verifying the user is authorized to use the machine.

Step 248 is an inquiry if the user engagement has been completed. This step can inhibit accidental operation of the machine, and/or unexpected operation by an unsuspecting user.

Step 250 is then authorizing operation of the machine. This can then include instructions to feed foam to the machine, buzzers or other audible outputs for safety purposes, confirmation of collection devices for catching extrusions, etc.

Figure 5:
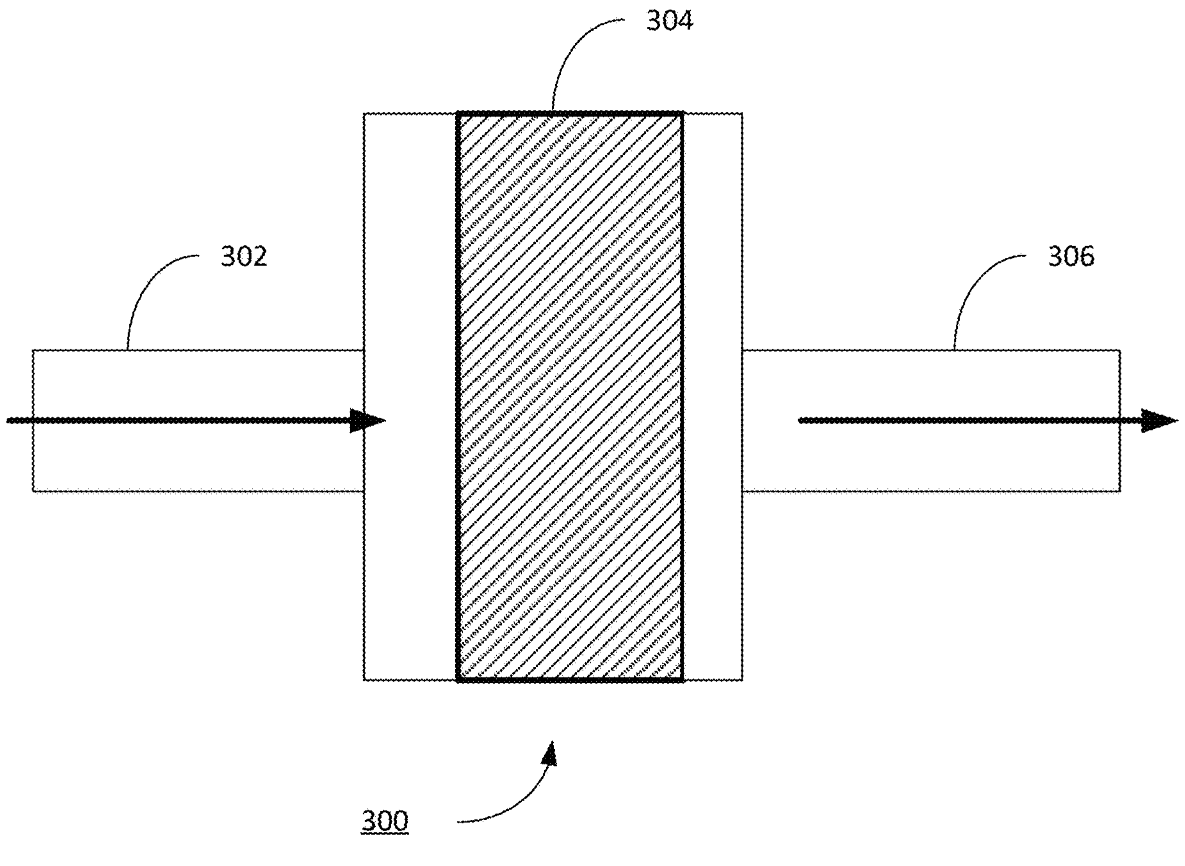
FIG. 5 is a side-view illustration of one embodiment of an air filtration system within the foam densifier machine.

FIG. 5 is a side-view of one embodiment of the air filtration system 300. This includes incoming air flow 302 extracted from within the densifier. The airflow is captured within airtight piping and passed across filter 304.

The output air flow 306 can then be output in near proximity to the densifier without risk to operator.

As described herein, the densifier apparatus and operating method improves upon existing techniques, improving user safety and interactive controls for both improved user operation but also for reducing operator-error in damaging the machine.

Figures are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. As used herein, executable operations and executable instructions can be performed based on transmission to one or more processing devices via storage in a non-transitory computer readable medium.

What is claimed is:

1. An apparatus for densifying foam comprising:

an intake chute having an aperture for receiving foam therein;

at least one grinder mechanism for converting the foam into foam particles;

an augur receiving the foam particles from the grinder mechanism and transporting the foam particles;

a heating unit having the foam particles transported therethrough via rotation of the augur, the heating unit heating the foam particles from a first temperature to a second temperature, wherein the second temperature is below a melting temperature of the foam particles but high enough to weaken bonds of the foam particles and overcome any material memory of the foam particles;

an extrusion unit compressing the foam particles at the second temperature into a compressed state;

an extrusion outlet for removal of the foam particles in the compressed state; and a control panel including a visual display component and executable instructions for operation of the apparatus, such that the augur is prohibited from operation until the heating unit reaches a predetermined operating temperature and the control panel including graphical user interface functions displayed on the visual display component for enabling operation of apparatus.

2. The apparatus of claim 1 further comprising:

at least one internal air capture system for capturing gaseous output from the operations of the heating unit, such gaseous output generated from the heat applied to the foam particles;

at least one air filtration system including at least one air filter for filtering the gaseous output; and at least one outlet on a backside of the air filtration system for release of the gaseous output excluding air particulates removed via the air filtration system.

3. The apparatus of claim 2, wherein the air filter includes at least one of: a high efficiency particulate air filter, a charcoal-based air filter.

4. The apparatus of claim 1, wherein the foam includes at least one of: expanded polystyrene, expanded polyethylene, and expanded polypropylene.

5. The apparatus of claim 4 further comprising: the control panel including the graphical user interface having an input screen for determining a type of foam; executable instructions for the processing device for processing the type of foam input and determining operational parameters based therein; and the control panel modifying operation of the apparatus based on the operational parameters.

6. The apparatus of claim 1, wherein the control panel includes a second display screen for providing operational information thereto.

7. The apparatus of claim 6, wherein the second display screen is external to the apparatus, such that communication with the second display screen is via a wireless communication protocol.

8. The apparatus of claim 1 further comprising: a plurality of operational sensors disposed within the apparatus and monitor operations thereof; the operational sensors transmitting operational status data to the control panel; and the control panel managing operational parameters based on the operational status data.

* * * * *